US010059267B2

(12) United States Patent
Koyama et al.

(10) Patent No.: US 10,059,267 B2
(45) Date of Patent: Aug. 28, 2018

(54) REARVIEW MIRROR ANGLE SETTING SYSTEM, METHOD, AND PROGRAM

(71) Applicant: AISIN AW CO., LTD., Anjo-shi, Aichi-ken (JP)

(72) Inventors: Ryoji Koyama, Nukata (JP); Tomoki Kubota, Okazaki (JP)

(73) Assignee: AISIN AW CO., LTD., Aajo (JP)

( * ) Notice: Subject to any disclaimer, the term of this patent is extended or adjusted under 35 U.S.C. 154(b) by 205 days.

(21) Appl. No.: 15/104,850

(22) PCT Filed: Jan. 15, 2015

(86) PCT No.: PCT/JP2015/050883
§ 371 (c)(1),
(2) Date: Jun. 15, 2016

(87) PCT Pub. No.: WO2015/115185
PCT Pub. Date: Aug. 6, 2015

(65) Prior Publication Data
US 2017/0001567 A1  Jan. 5, 2017

(30) Foreign Application Priority Data
Jan. 28, 2014 (JP) ................................ 2014-013414

(51) Int. Cl.
*B60R 1/072* (2006.01)
*G06K 9/20* (2006.01)
(Continued)

(52) U.S. Cl.
CPC .......... *B60R 1/072* (2013.01); *G06K 9/00791* (2013.01); *G06K 9/2063* (2013.01);
(Continued)

(58) Field of Classification Search
CPC ........... B60R 1/006; B60R 1/02; B60R 1/025; B60R 1/04; B60R 1/06; B60R 1/062;
(Continued)

(56) References Cited

U.S. PATENT DOCUMENTS 8,645,029 B2    2/2014  Kim et al.
2002/0163482 A1*  11/2002  Sullivan ............. G02B 27/2278
                                                  345/6
(Continued)

FOREIGN PATENT DOCUMENTS

DE    102012203795 A1 *  9/2013  ............... B60N 2/48
JP       2003-118487 A      4/2003
(Continued)

OTHER PUBLICATIONS

Apr. 7, 2015 Search Report issued in International Patent Application No. PCT/JP2015/050883.

*Primary Examiner* — Thomas G Black
*Assistant Examiner* — Sara J Lewandroski
(74) *Attorney, Agent, or Firm* — Oliff PLC

(57) ABSTRACT

Rearview mirror angle setting systems, methods, and programs display, on a display, a peripheral image of a vehicle that includes a visible region that is visually recognizable in a rearview mirror at a variable angle. The systems, methods, and programs display a reference point in the peripheral image, and move a position of the reference point in the peripheral image in accordance with a moving operation by a user. The systems, methods, and programs set the angle of the rearview mirror such that the position of the reference point, which has been moved, is visually recognizable in the rearview mirror.

9 Claims, 4 Drawing Sheets

(51) Int. Cl.
*G06K 9/00* (2006.01)
*H04N 7/18* (2006.01)
*H04N 5/247* (2006.01)
*B60R 16/037* (2006.01)

(52) U.S. Cl.
CPC ............. *H04N 5/247* (2013.01); *H04N 7/181* (2013.01); *B60R 16/037* (2013.01)

(58) Field of Classification Search
CPC ...... B60R 1/07; B60R 1/072; G06K 9/00791; G06K 9/2054; G06K 9/2064; G06K 9/3233; G06K 2009/3225
See application file for complete search history.

(56) References Cited

U.S. PATENT DOCUMENTS

| | | | |
|---|---|---|---|
| 2005/0131609 A1 | 6/2005 | Noda et al. | |
| 2007/0064104 A1 | 3/2007 | Ikeda | |
| 2010/0177413 A1 | 7/2010 | Lee et al. | |
| 2010/0194596 A1* | 8/2010 | Wang | B60R 1/00 340/936 |
| 2010/0245577 A1* | 9/2010 | Yamamoto | B60R 1/00 348/148 |
| 2012/0093358 A1 | 4/2012 | Tschirhart | |
| 2012/0249796 A1* | 10/2012 | Kinoshita | B60R 1/00 348/148 |
| 2013/0054086 A1* | 2/2013 | Lo | B60R 1/00 701/36 |
| 2015/0191118 A1* | 7/2015 | Matsukawa | H04N 7/183 348/148 |

FOREIGN PATENT DOCUMENTS

| | | | |
|---|---|---|---|
| JP | 2003-339044 A | | 11/2003 |
| JP | 2005-153742 A | | 6/2005 |
| JP | 2007-088584 A | | 4/2007 |
| JP | 2008-265636 A | | 11/2008 |
| JP | 2008265636 A | * | 11/2008 |
| JP | 2010-183170 A | | 8/2010 |
| JP | 2011-188028 A | | 9/2011 |
| JP | 2012-237725 A | | 12/2012 |
| JP | 2013-014310 A | | 1/2013 |
| JP | 2013-168063 A | | 8/2013 |

* cited by examiner

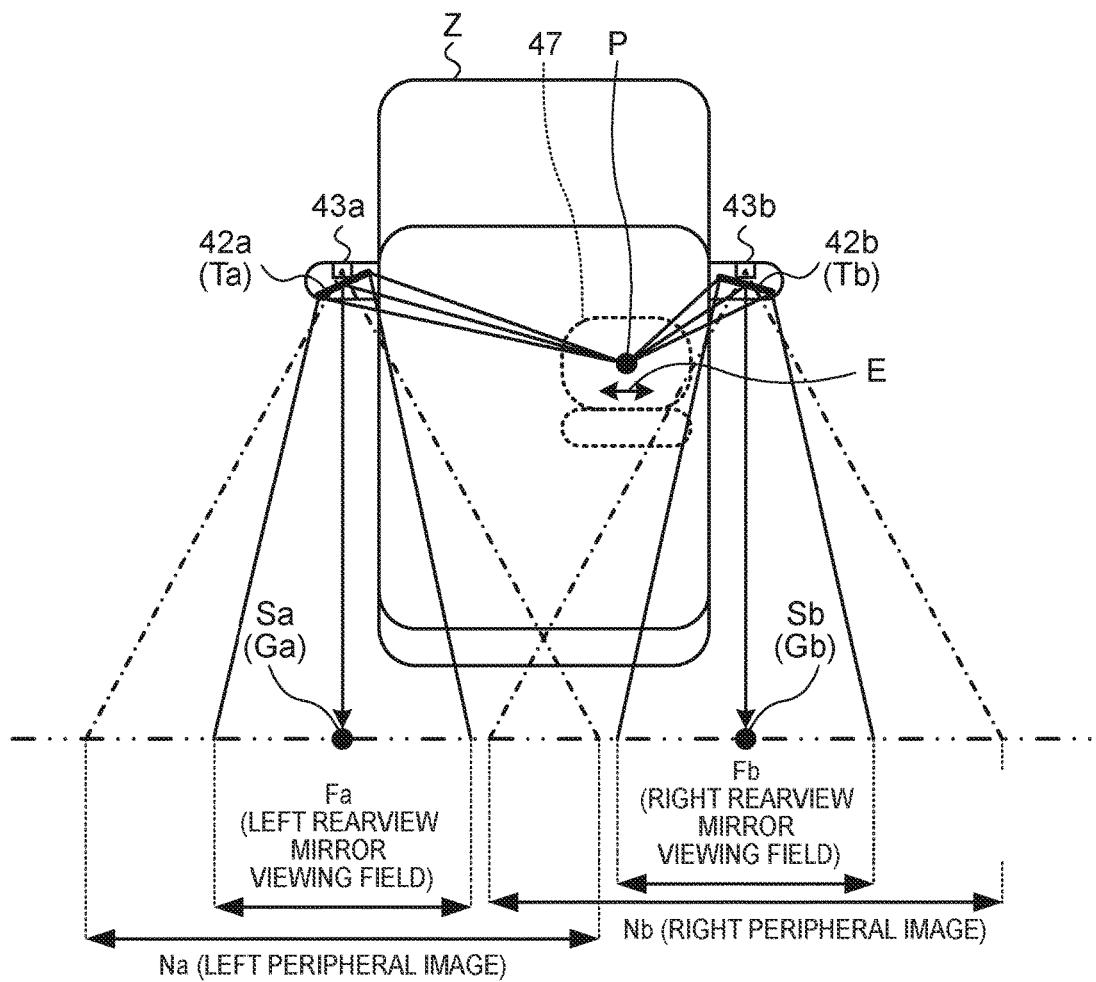
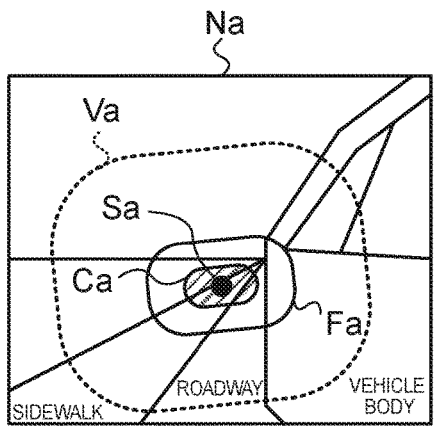
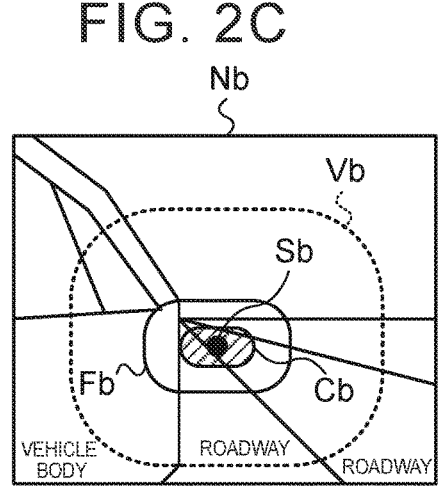

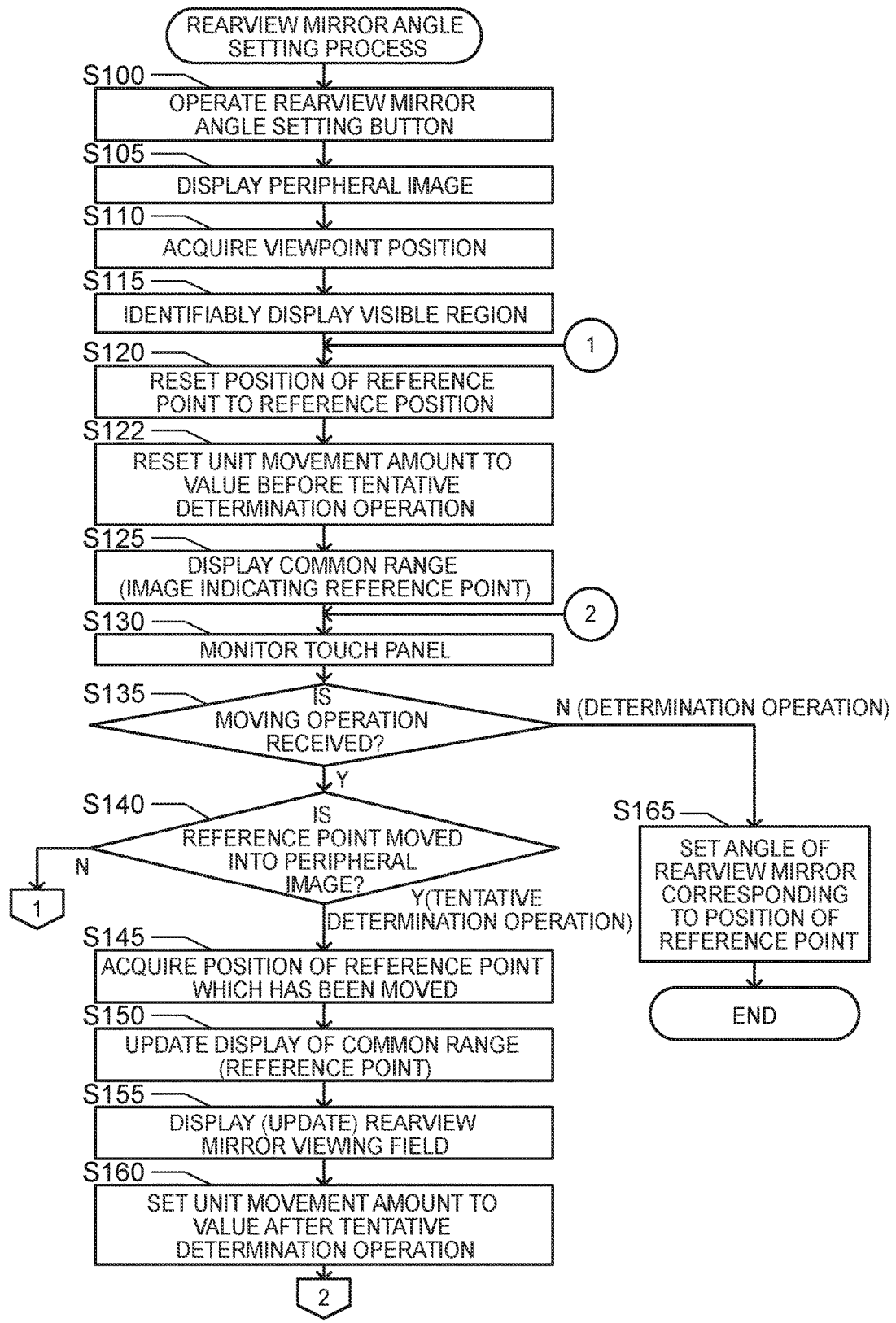

REARVIEW MIRROR ANGLE SETTING SYSTEM, METHOD, AND PROGRAM

TECHNICAL FIELD

Related technical fields include rearview mirror angle setting systems, methods, and programs that set the angle of a rearview mirror.

BACKGROUND

There is known a technology for generating a virtual avatar on the basis of a visual image obtained by imaging a driver and estimating how a mirror would be seen in the eyes of the virtual avatar (see FIGS. 9 and 10 of Japanese Patent Application Publication No. 2013-14310 (JP 2013-14310 A)). In JP 2013-14310 A, the mirror is rotated such that the proportion between an upper portion and a lower portion with respect to a virtual horizontal line that appears on the mirror etc. is optimum. According to the technology, the mirror can be rotated in a direction that is suitable for the posture of the driver.

SUMMARY

However, there is an issue that the position that the driver desires to see in the mirror is different in accordance with the taste of the driver, and that therefore the angle of the mirror cannot be set in accordance with the taste of the driver.

Exemplary embodiments of the broad inventive principles described herein have been made in view of the foregoing issue, and have an object to provide a technology that allows setting the angle of a rearview mirror such that a position that the user desires to see is visually recognizable.

Exemplary embodiments provide a rearview mirror angle setting systems, methods, and programs that display, on a display, a peripheral image of a vehicle that includes a visible region that is visually recognizable in a rearview mirror at a variable angle; display a reference point in the peripheral image; move a position of the reference point in the peripheral image in accordance with a moving operation by a user; and set the angle of the rearview mirror such that the position of the reference point which has been moved is visually recognizable in the rearview mirror.

According to the exemplary embodiments, the user can move the position of the reference point as desired by performing the moving operation, and can set the angle of the rearview mirror such that the position of the reference point is visually recognizable. That is, the angle of the rearview mirror can be set such that a position that the user desires to see is visually recognizable.

BRIEF DESCRIPTION OF THE DRAWINGS

FIG. 2A is a schematic plan view of a vehicle, and FIGS. 2B and 2C illustrate an example of a peripheral image.

FIG. 4 is a flowchart of a rearview mirror angle setting process.

DETAILED DESCRIPTION OF EXEMPLARY EMBODIMENTS

Figure 1:
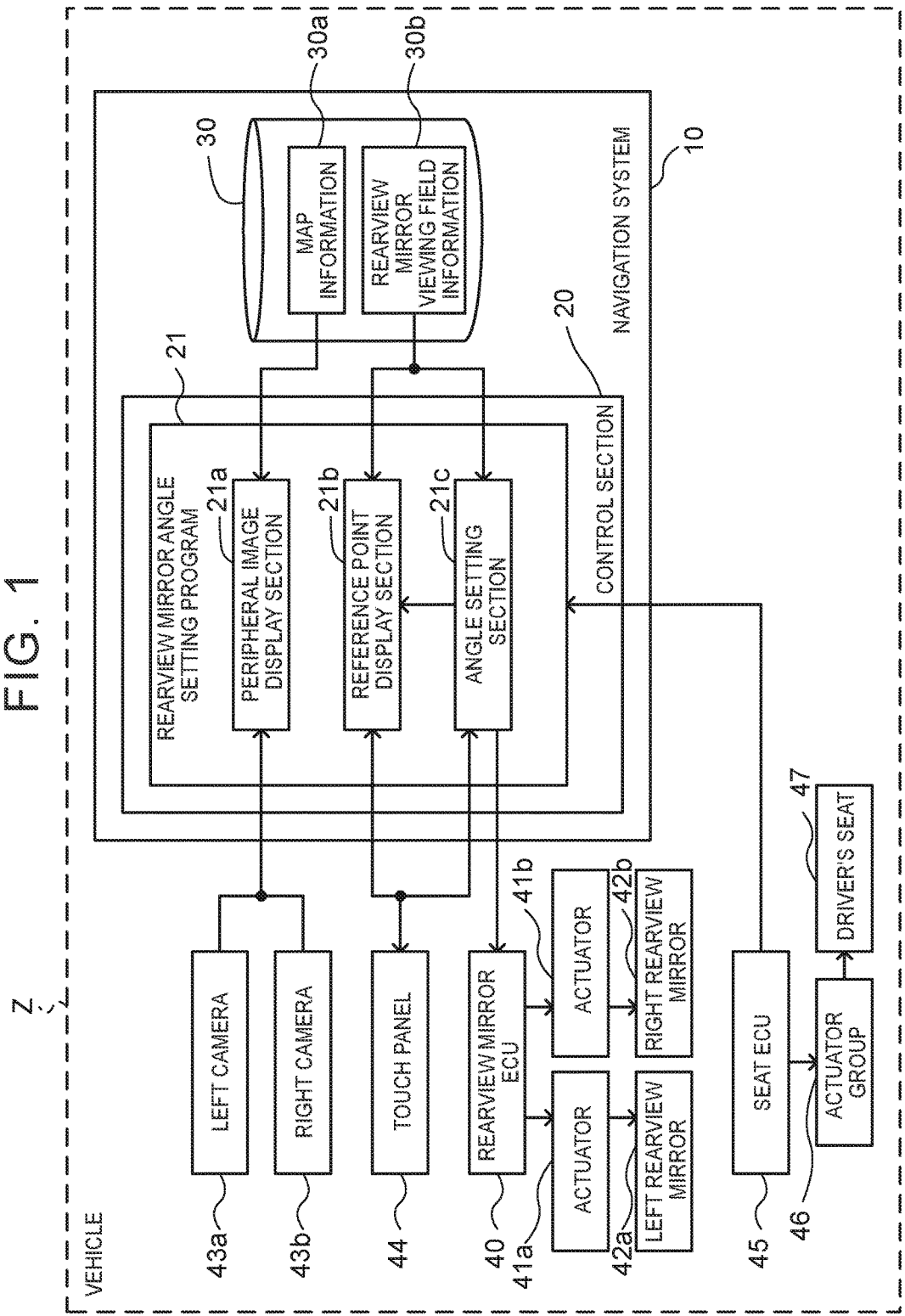
FIG. 1 is a block diagram of a navigation system that includes a rearview mirror angle setting system.

An embodiment will be described below in the following order:

(1) Configuration of Navigation System
(2) Rearview Mirror Angle Setting Process
(3) Other Embodiments (1) Configuration of Navigation System FIG. 1 is a block diagram illustrating the configuration of a navigation system 10 that includes a rearview mirror angle setting system. The navigation system 10 is provided in a vehicle Z. The navigation system 10 includes a control section 20 that includes a CPU, having internal storage media in the form of a RAM and a ROM, and so forth. The navigation system 10 also includes a storage medium 30. (As used herein, the terms "storage media" and "storage medium" are not intended to encompass transitory signals.) The control section 20 executes programs stored in the storage medium 30 and the ROM. In the embodiment, a navigation program can be executed as one of the programs. The navigation program includes a rearview mirror angle setting program 21 as a program module that implements one of the functions of the navigation program. The control section 20 executes the rearview mirror angle setting program 21 to cause the navigation system 10 to function as a rearview mirror angle setting system that sets the angle of a rearview mirror.

The storage medium 30 stores map information 30a. The map information 30a includes node data that indicate the position of nodes set on roads on which the vehicle Z travels, shape interpolation point data for specifying the shape of road sections (links) that connect between the nodes, link data that are information on the road sections that connect between the nodes, facility data that are information on facilities, and so forth.

The storage medium 30 also stores rearview mirror viewing field information 30b. The rearview mirror viewing field information 30b is data for specifying, for each of left and right rearview mirrors (door mirrors), a rearview mirror viewing field which is the range that is visually recognizable in the rearview mirror.

FIG. 2A is a schematic plan view of the vehicle Z for illustrating the rearview mirror viewing field. The vehicle Z includes a left rearview mirror 42a (thick line) and a right rearview mirror 42b (thick line) provided on the left and right side surfaces, respectively. As illustrated in FIG. 2A, a region that is seen in the left rearview mirror 42a and a region that is seen in the right rearview mirror 42b to be visually recognizable in the case where the left rearview mirror 42a and the right rearview mirror 42b are visually recognized from a viewpoint position P of a user (driver) correspond to a left rearview mirror viewing field Fa and a right rearview mirror viewing field Fb, respectively. A region surrounded by light rays reflected by the outer peripheral edge of the left rearview mirror 42a and a region surrounded by light rays reflected by the outer peripheral edge of the right rearview mirror 42b to reach the viewpoint position P correspond to the left rearview mirror viewing field Fa and the right rearview mirror viewing field Fb, respectively. As illustrated in FIG. 2A, a region located between light rays reflected by both ends, in the horizontal direction, of the left rearview mirror 42a to reach the viewpoint position P corresponds to the left rearview mirror viewing field Fa in the horizontal direction. Similarly, a region located between light rays reflected by both ends, in the horizontal direction, of the right rearview mirror 42b to reach the viewpoint position P corresponds to the right rearview mirror viewing field Fb in the horizontal direction.

Here, the left rearview mirror viewing field Fa and the right rearview mirror viewing field Fb depend on the viewpoint position P and angles Ta and Tb of the left rearview mirror 42a and the right rearview mirror 42b, respectively. Therefore, in the rearview mirror viewing field information 30b, the left rearview mirror viewing field Fa is stored for each combination of the viewpoint position P and the angle Ta of the left rearview mirror 42a, and the right rearview mirror viewing field Fb is stored for each combination of the viewpoint position P and the angle Tb of the right rearview mirror 42b.

Figure 3:
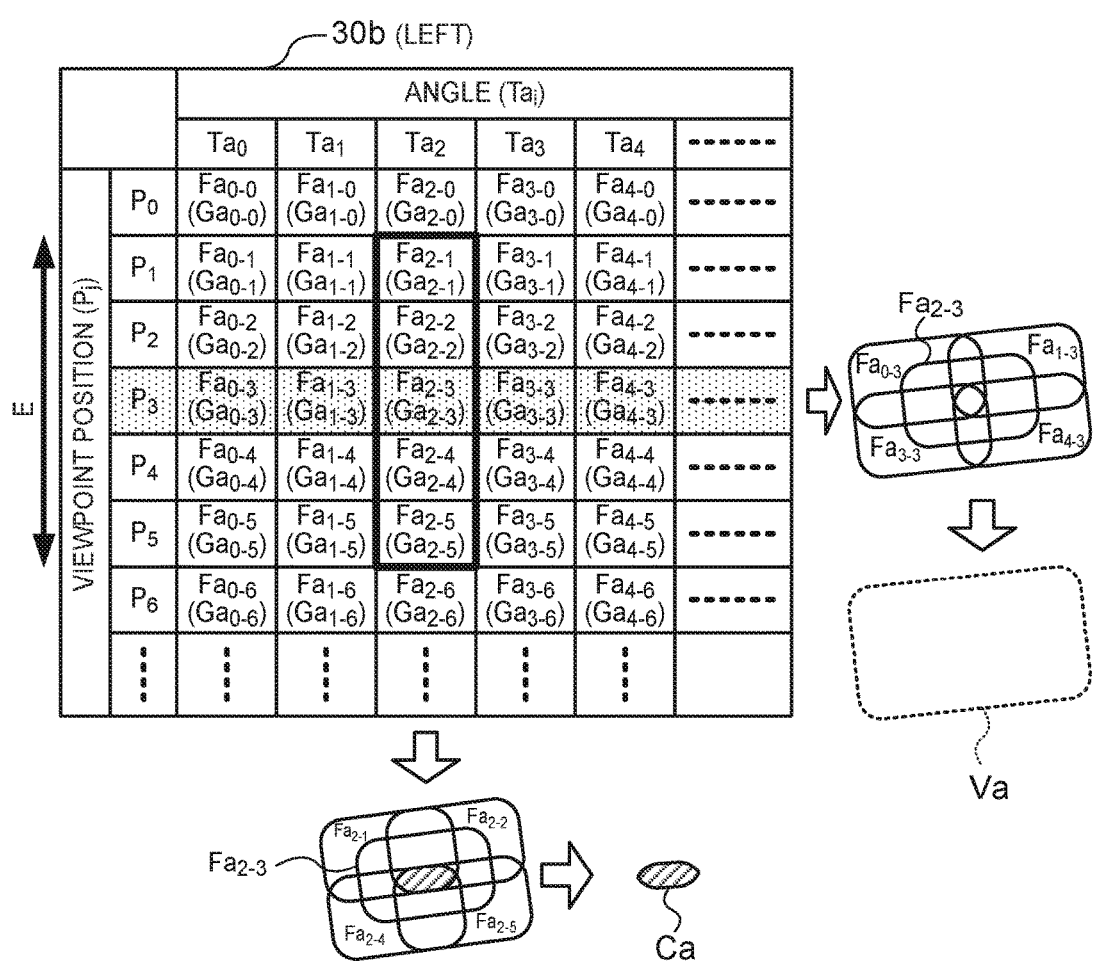
FIG. 3 is a table indicating rearview mirror viewing field information.

FIG. 3 is a table indicating the rearview mirror viewing field information 30b (for only the left rearview mirror viewing field Fa). As illustrated in the drawing, a left rearview mirror viewing field $Fa_{i-j}$ is specified for each combination of any viewpoint position $P_0$, $P_1$, $P_2$ . . . $P_i$ . . . and any angle $Ta_0$, $Ta_1$, $Ta_2$ . . . $Ta_j$ . . . of the left rearview mirror 42a. The rearview mirror viewing field information 30b can be prepared by examining the ranges that are visually recognizable in the left rearview mirror 42a and the right rearview mirror 42b while varying the viewpoint position P and the angles Ta and Tb of the left rearview mirror 42a and the right rearview mirror 42b, respectively. As a matter of course, the rearview mirror viewing field information 30b may be prepared by estimating the optical path of light reflected by the outer peripheral edge of each of the left rearview mirror 42a and the right rearview mirror 42b to reach the viewpoint position P. Here, the term "any viewpoint position P" refers to a position to which the viewpoint of the user seated on the driver's seat may be moved, and a position to which the viewpoint of the user may be moved in the case where the state of the driver's seat is varied in the entire region within the movable range. In addition, the term "any angle Ta, Tb of the left rearview mirror 42a and the right rearview mirror 42b" refers to the angles Ta and Tb of the left rearview mirror 42a and the right rearview mirror 42b to which the left rearview mirror 42a and the right rearview mirror 42b may be varied, respectively, in the case where the left rearview mirror 42a and the right rearview mirror 42b are varied in the entire region within the movable range.

The vehicle Z which includes the navigation system 10 includes a GPS reception section, a vehicle speed sensor, a gyro sensor, and so forth (not illustrated). The control section 20 specifies the current position of the vehicle Z on the basis of an output signal from the GPS reception section, the vehicle speed sensor, the gyro sensor, and so forth and the map information 30a. In addition, the control section 20 executes the navigation program to search for an expected travel route to a destination location, compare the current position of the vehicle Z and the expected travel route, provide guidance that allows the vehicle Z to travel along the expected travel route, etc.

As illustrated in FIG. 1, the vehicle Z includes a rearview mirror ECU (Electrical Control Unit) 40, actuators 41a and 41b, the left rearview mirror 42a, the right rearview mirror 42b, a left camera 43a, a right camera 43b, a touch panel 44, a seat ECU 45, an actuator group 46, and a driver's seat 47. The rearview mirror ECU 40 is a computer that drives the actuators 41a and 41b, which are provided at the left rearview mirror 42a and the right rearview mirror 42b, to adjust the angles Ta and Tb of the left rearview mirror 42a and the right rearview mirror 42b, respectively. The rearview mirror ECU 40 outputs a signal for specifying the current angles Ta and Tb of the left rearview mirror 42a and the right rearview mirror 42b, respectively, to the control section 20, and drives the actuators 41a and 41b so as to achieve the angles Ta and Tb of the left rearview mirror 42a and the right rearview mirror 42b, respectively, which are indicated by a control signal output from the control section 20. In the embodiment, the angles Ta and Tb of the left rearview mirror 42a and the right rearview mirror 42b are adjustable by the actuators 41a and 41b, respectively, in the horizontal direction and the vertical direction.

The left camera 43a and the right camera 43b are imaging elements that take a left peripheral image Na and a right peripheral image Nb, respectively, which include respective visible regions that are visually recognizable in the left rearview mirror 42a and the right rearview mirror 42b at the variable angles Ta and Tb, respectively. In the embodiment, the left camera 43a and the right camera 43b are provided in a cover that houses the left rearview mirror 42a and the right rearview mirror 42b, respectively. The angle of view and the optical axis direction of each of the left camera 43a and the right camera 43b are set such that the entirety of the left rearview mirror viewing field Fa and the entirety of the right rearview mirror viewing field Fb are included in the left peripheral image Na and the right peripheral image Nb with any combination of the viewpoint position P and the angle Ta and any combination of the viewpoint position P and the angle Tb, respectively. That is, the left camera 43a and the right camera 43b are provided such that any left rearview mirror viewing field Fa stored in the rearview mirror viewing field information 30b is included in the left peripheral image Na and any right rearview mirror viewing field Fb is included in the right peripheral image Nb. In the rearview mirror viewing field information 30b, a coordinate in the left peripheral image Na that corresponds to the left rearview mirror viewing field Fa is stored as information for specifying the left rearview mirror viewing field Fa. Similarly, a coordinate in the right peripheral image Nb that corresponds to the right rearview mirror viewing field Fb is stored as information for specifying the right rearview mirror viewing field Fb.

FIGS. 2B and 2C illustrate the left peripheral image Na and the right peripheral image Nb, respectively. As illustrated in the drawings, the left rearview mirror viewing field Fa is included in the left peripheral image Na, and the right rearview mirror viewing field Fb is included in the right peripheral image Nb. In the example of FIGS. 2B and 2C, images of a roadway, a sidewalk, and the vehicle body are included in each of the left peripheral image Na and the right peripheral image Nb.

The touch panel 44 is a display device that displays various types of UI screens on the basis of a picture signal output from the control section 20. The touch panel 44 is also an input device that detects touch by a finger of the user, a touch pen, etc. (hereinafter referred to as "finger etc.") on the touch panel 44 to output a signal that indicates the position of the touch by the finger etc. to the control section 20.

The seat ECU 45 is a computer that drives the actuator group 46 to adjust the state of the driver's seat 47 on which the user is seated. Specifically, the seat ECU 45 drives the actuator group 46 on the basis of a control signal from the control section 20 to adjust the state of the driver's seat 47 (such as the front-rear position of the entire seat, the height of a seat surface portion, and the inclination angle of a backrest portion). The seat ECU 45 also outputs a signal that indicates the current adjustment state of the driver's seat 47 to the control section 20.

Next, the software configuration of the rearview mirror angle setting program 21 will be described. The rearview mirror angle setting program 21 includes a peripheral image display section 21a, a reference point display section 21b, and an angle setting section 21c.

The peripheral image display section 21a is a program module that causes the control section 20 to implement a function of causing the touch panel 44 to display the left peripheral image Na and the right peripheral image Nb of the vehicle Z which include respective visible regions that are visually recognizable in the left rearview mirror 42a and the right rearview mirror 42b at the variable angles Ta and Tb, respectively. That is, through the function of the peripheral image display section 21a, the control section 20 causes the touch panel 44 to display the left peripheral image Na and the right peripheral image Nb. As discussed above, any left rearview mirror viewing field Fa stored in the rearview mirror viewing field information 30b is included in the left peripheral image Na, and any right rearview mirror viewing field Fb is included in the right peripheral image Nb. Therefore, respective peripheral images that include visible regions that are visually recognizable in the left rearview mirror 42a and the right rearview mirror 42b at the variable angles Ta and Tb can be displayed by displaying the left peripheral image Na and the right peripheral image Nb, respectively. Images other than the left peripheral image Na and the right peripheral image Nb are displayed on the touch panel 44.

In addition, through the function of the peripheral image display section 21a, the control section 20 displays an image that identifies the visible region and a region outside the visible region in each of the left peripheral image Na and the right peripheral image Nb. In the embodiment, the control section 20 displays a boundary line (the broken lines in FIGS. 2B and 2C) between the visible region and the region outside the visible region as the image that identifies the visible region and the region outside the visible region. The regions inside the boundary line are a left visible region Va and a right visible region Vb. The control section 20 may display images obtained by filling the left visible region Va and the right visible region Vb with predetermined colors as the images that identify the left visible region Va and the right visible region Vb, respectively.

A method of acquiring the left visible region Va and the right visible region Vb will be described below. In the embodiment, the control section 20 acquires the left visible region Va and the right visible region Vb on the basis of the viewpoint position P. Here, the viewpoint position P is acquired on the basis of the state of the driver's seat 47 on which the user is seated. That is, the control section 20 acquires a signal that indicates the current adjustment state of the driver's seat 47 (such as the front-rear position of the entire seat, the height of the seat surface portion, and the inclination angle of the backrest portion) from the seat ECU 45, and acquires the viewpoint position P on the basis of the signal. For example, the control section 20 may acquire a position located forward as the viewpoint position P as the entire driver's seat 47 is located forward. In addition, the control section 20 may acquire a higher position as the viewpoint position P as the seat surface portion of the driver's seat 47 is higher. Further, the control section 20 may estimate the front-rear position and the height of a headrest provided above the backrest portion of the driver's seat 47 on the basis of the inclination angle of the backrest portion, and acquire the viewpoint position P on the basis of the front-rear position and the height of the headrest. A table that prescribes the correspondence between the combination of the front-rear position of the entire driver's seat 47, the height of the seat surface portion, and the inclination angle of the backrest portion and the viewpoint position P may be prepared in advance, and the control section 20 may acquire the viewpoint position P with reference to the table. In addition, the control section 20 may acquire the viewpoint position P on the basis of the state of the driver's seat 47 and the body shape of the user.

When the viewpoint position P is acquired, the control section 20 acquires, as the left visible region Va and the right visible region Vb, ranges that are visually recognizable from the viewpoint position P in the case where the left rearview mirror 42a and the right rearview mirror 42b are varied to any angle Ta, Tb, respectively. Specifically, the control section 20 acquires all the left rearview mirror viewing fields Fa and the right rearview mirror viewing fields Fb correlated with the viewpoint position P in the rearview mirror viewing field information 30b. Then, the control section 20 superposes all the left rearview mirror viewing fields Fa correlated with the viewpoint position P on the left peripheral image Na, and acquires a region covered by at least one left rearview mirror viewing field Fa as the left visible region Va. In FIG. 3, a viewpoint position $P_3$ has been acquired on the basis of the state of the driver's seat 47, and a region covered by at least one of all the left rearview mirror viewing fields $Fa_{0-3}$, $Fa_{1-3}$, $Fa_{2-3}$ . . . (hatched) correlated with the viewpoint position $P_3$ is acquired as the left visible region Va (in the broken frame). Similarly, the control section 20 superposes all the right rearview mirror viewing fields Fb correlated with the viewpoint position P on the right peripheral image Nb, and acquires a region covered by at least one right rearview mirror viewing field Fb as the right visible region Vb. Then, as indicated by the broken lines in FIGS. 2B and 2C, the control section 20 displays a boundary line that identifies the left visible region Va and the right visible region Vb from the other region in the left peripheral image Na and the right peripheral image Nb, respectively.

The reference point display section 21b is a program module that causes the control section 20 to implement a function of displaying a reference point in each of the left peripheral image Na and the right peripheral image Nb. That is, through the function of the reference point display section 21b, the control section 20 displays an image that indicates the position of the reference point in each of the left peripheral image Na and the right peripheral image Nb. Here, the term "position of the reference point" refers to a position in each of the left peripheral image Na and the right peripheral image Nb that the user intends to visually recognize at the center of the mirror surface of each of the left rearview mirror 42a and the right rearview mirror 42b. In addition, the position of the reference point is acquired on the basis of an operation by the user on the touch panel 44.

As illustrated in FIGS. 2B and 2C, a left common range Ca (hatched) and a right common range Cb (hatched) are displayed in the left peripheral image Na and the right peripheral image Nb, as images that indicate the positions of a left reference point Sa and a right reference point Sb, respectively. The presence of the left reference point Sa and the right reference point Sb in the left common range Ca and the right common range Cb allows the user to recognize the position of the left reference point Sa and the right reference point Sb, respectively. For illustration, each of the left reference point Sa and the right reference point Sb is indicated by a black dot. However, the black dot may be displayed, or may not be displayed.

Here, the left common range Ca and the right common range Cb are ranges that are commonly visually recognizable in the case where the left rearview mirror 42a and the right rearview mirror 42b at the angles Ta and Tb adjusted respectively such that the positions of the left reference point Sa and the right reference point Sb are visually recognizable at the center of the mirror surfaces are seen from any position within an error range E from the viewpoint position P. That is, through the function of the reference point display section 21b, the control section 20 displays the left common range Ca and the right common range Cb in the left peripheral image Na and the right peripheral image Nb, respectively, the left common range Ca and the right common range Cb being commonly visually recognizable in the case where the left rearview mirror 42a and the right rearview mirror 42b at the angles Ta and Tb adjusted respectively such that the positions of the left reference point Sa and the right reference point Sb are visually recognizable at the center are seen from any position within the error range E from the viewpoint position P.

A method of acquiring the left common range Ca and the right common range Cb will be described below. The positions that are visually recognizable at the center of the mirror surfaces of the left rearview mirror 42a and the right rearview mirror 42b depend on the viewpoint position P and the angles Ta and Tb of the left rearview mirror 42a and the right rearview mirror 42b, respectively. Therefore, in the rearview mirror viewing field information 30b of FIG. 3, a left center position Ga and a right center position Gb that are visually recognizable at the center of the mirror surfaces of the left rearview mirror 42a and the right rearview mirror 42b are stored for each combination of the viewpoint position P and the angle Ta of the left rearview mirror 42a and each combination of the viewpoint position P and the angle Tb of the right rearview mirror 42b, respectively. As illustrated in FIG. 2A, each of the left center position Ga and the right center position Gb may be specified by actually examining the position that is visually recognizable at the center of the mirror surface of each of the left rearview mirror 42a and the right rearview mirror 42b, or may be the center of gravity of each of the left rearview mirror viewing field Fa and the right rearview mirror viewing field Fb.

First, the control section 20 acquires the viewpoint position P and the position of the left reference point Sa. Then, the control section 20 acquires the angle Ta of the left rearview mirror 42a which is correlated with the left center position Ga that is the closest to the position of the left reference point Sa, among the left center positions Ga which are correlated with the viewpoint position P based on the shape of the driver's seat 47. It is assumed that the left center position $Ga_{2-3}$, among the left center positions Ga which are correlated with the viewpoint position $P_3$, is the closest to the position of the left reference point Sa in FIG. 3, and that the angle $Ta_2$ is acquired. The term "angle $Ta_2$" means the angle Ta of the left rearview mirror 42a at which the position of the left reference point Sa is visually recognizable at the center.

Next, the control section 20 sets the error range E centered on the viewpoint position $P_3$, and acquires all the viewpoint positions $P_1$ to $P_5$ (in the thick frame of FIG. 3) that are present within the error range E. Then, the control section 20 acquires the left rearview mirror viewing fields $Fa_{2-1}$ to $Fa_{2-5}$ which are correlated with combinations of the angle $Ta_2$ of the left rearview mirror 42a at which the position of the left reference point Sa is visually recognizable at the center and the viewpoint positions $P_1$ to $P_5$ within the error range E. Further, the control section 20 superposes all the acquired left rearview mirror viewing fields $Fa_{2-1}$ to $Fa_{2-5}$ on the left peripheral image Na, and acquires a region (hatched) overlapped by all the left rearview mirror viewing fields $Fa_{2-1}$ to $Fa_{2-5}$ as the left common range Ca. In the manner described above, it is possible to acquire the left common range Ca which is commonly visually recognizable in the case where the left rearview mirror 42a adjusted to the angle $Ta_2$ at which the position of the left reference point Sa is visually recognizable at the center is seen from any of the positions $P_1$ to $P_5$ within the error range E from the viewpoint position P. The control section 20 can acquire the right common range Cb by executing a similar process also for the right reference point Sb. Then, as indicated as hatched in FIGS. 2B and 2C, the control section 20 displays the left common range Ca and the right common range Cb in the left peripheral image Na and the right peripheral image Nb, respectively.

The term "error range E" refers to a range in which the viewpoint position P may be varied in accordance with the body shape, the posture, the direction of the face, etc. of the user in the case where the state of the driver's seat 47 is constant. The error range E may be any range within a three-dimensional solid centered on the viewpoint position $P_3$, and may be a range within a sphere, a cube, or a rectangular parallelepiped centered on the viewpoint position $P_3$. As a matter of course, the number of viewpoint positions P within the error range E is not limited to five.

Further, through the function of the reference point display section 21b, the control section 20 displays, in the left peripheral image Na and the right peripheral image Nb, the left rearview mirror viewing field Fa and the right rearview mirror viewing field Fb, respectively, which indicate respective ranges that are visually recognizable together with the positions of the left reference point Sa and the right reference point Sb in the case where the left rearview mirror 42a and the right rearview mirror 42b at the angles Ta and Tb respectively adjusted such that the positions of the left reference point Sa and the right reference point Sb are visually recognizable are seen. Specifically, the control section 20 acquires the angle Ta of the left rearview mirror 42a which is correlated with the left center position Ga that is the closest to the left reference point Sa, among the left center positions Ga which are correlated with the viewpoint position P based on the shape of the driver's seat 47, in the rearview mirror viewing field information 30b, and displays the left rearview mirror viewing field Fa (solid line of FIG. 2B) which is correlated with the viewpoint position P and the angle Ta in the left peripheral image Na. Similarly, the control section 20 acquires the angle Tb of the right rearview mirror 42b which is correlated with the right center position Gb that is the closest to the right reference point Sb, among the right center positions Gb which are correlated with the viewpoint position P based on the shape of the driver's seat 47, and displays the right rearview mirror viewing field Fb (solid line of FIG. 2C) which is correlated with the viewpoint position P and the angle Tb in the right peripheral image Nb. The control section 20 may display images obtained by filling the left rearview mirror viewing field Fa and the right rearview mirror viewing field Fb with predetermined colors as the images that indicate the left rearview mirror viewing field Fa and the right rearview mirror viewing field Fb, respectively.

In addition, through the function of the reference point display section 21b, the control section 20 displays the left rearview mirror viewing field Fa and the right rearview mirror viewing field Fb in the left peripheral image Na and the right peripheral image Nb, respectively, in the case where a tentative determination operation for the positions of the left reference point Sa and the right reference point Sb is received. That is, the left rearview mirror viewing field Fa and the right rearview mirror viewing field Fb are not always displayed, but displayed in the case where a tentative determination operation for the positions of the left reference point Sa and the right reference point Sb is received on the touch panel 44. In the embodiment, the control section 20 considers that a tentative determination operation has been performed in the case where a moving operation of moving the left reference point Sa and the right reference point Sb has been ended on the touch panel 44. That is, the control section 20 considers that a tentative determination operation has been performed in the case where the finger etc. which has touched on the touch panel 44 for a moving operation for the left reference point Sa and the right reference point Sb is moved away from the touch panel 44. The control section 20 may consider that a tentative determination operation has been performed in the case where the finger etc. touches on a predetermined operation region (button) displayed on the touch panel 44.

The angle setting section 21*c* is a program module that causes the control section 20 to implement a function of moving the positions of the left reference point Sa and the right reference point Sb in the left peripheral image Na and the right peripheral image Nb, respectively, in accordance with a moving operation by the user, and setting the angles Ta and Tb of the left rearview mirror 42*a* and the right rearview mirror 42*b* such that the positions of the left reference point Sa and the right reference point Sb which have been moved are visually recognizable in the left rearview mirror 42*a* and the right rearview mirror 42*b*, respectively. In the embodiment, through the function of the angle setting section 21*c*, the control section 20 receives drag-and-drop operations of the left common range Ca and the right common range Cb on the touch panel 44 as the moving operations by the user. In the case where drag-and-drop operations of the left common range Ca and the right common range Cb are performed, the control section 20 acquires a position (drag position) on the touch panel 44 at which touch by the finger etc. is started and a position (drop position) on the touch panel 44 at which the touch by the finger etc. is ended.

Then, the control section 20 acquires an operation direction which is the direction from the drag position to the drop position and an operation amount which is the linear distance from the drag position to the drop position. Then, the control section 20 acquires, as the position of each of the left reference point Sa and the right reference point Sb which has been moved, a position obtained by moving the position of each of the left reference point Sa and the right reference point Sb which has not been moved in the operation direction, over a distance obtained by multiplying the operation amount by a predetermined unit movement amount.

Here, the term "unit movement amount" means a distance over which the left reference point Sa and the right reference point Sb are moved per unit amount (unit operation amount) of the operation amount which is the distance over which the user drags the finger etc. on the touch panel 44. Through the function of the angle setting section 21*c*, the control section 20 moves the positions of the left reference point Sa and the right reference point Sb in the left peripheral image Na and the right peripheral image Nb, respectively, in accordance with the moving operation, either before or after a tentative determination operation is received, and reduces the unit movement amount, over which the left reference point Sa and the right reference point Sb are moved in the left peripheral image Na and the right peripheral image Nb, respectively, in accordance with the unit operation amount of the moving operation in the case where a tentative determination operation is received.

Specifically, the control section 20 sets the unit movement amount to 1 before a tentative determination operation is received, and sets the unit movement amount to a predetermined value (e.g. 0.3) that is less than 1 after a tentative determination operation is received. For example, if the operation amount which is the distance over which the user drags the finger etc. on the touch panel 44 is 10 mm, the movement amount of each of the left reference point Sa and the right reference point Sb is 10 mm before a tentative determination operation is received, and 3 mm after a tentative determination operation is received. In the embodiment, it is considered that a tentative determination operation has been performed in the case where the first moving operation is ended. Therefore, the unit movement amount is set to a predetermined value that is less than 1 in the second moving operation.

When the positions of the left reference point Sa and the right reference point Sb which have been moved are acquired, the control section 20 updates display of the left peripheral image Na and the right peripheral image Nb in accordance with the positions of the left reference point Sa and the right reference point Sb which have been moved, respectively. That is, through the function of the peripheral image display section 21*a*, the control section 20 acquires the left rearview mirror viewing field Fa and the left common range Ca, and the right rearview mirror viewing field Fb and the right common range Cb, on the basis of the positions of the left reference point Sa and the right reference point Sb, which have been moved, respectively. The control section 20 displays updated images that indicate the left rearview mirror viewing field Fa and the left common range Ca, which have been acquired, in the left peripheral image Na, and the right rearview mirror viewing field Fb and the right common range Cb, which have been acquired, in the right peripheral image Nb. Consequently, the images which indicate the left reference point Sa and the right reference point Sb (the left common range Ca and the right common range Cb) are moved in the left peripheral image Na and the right peripheral image Nb, respectively. Further, in the case where a drag-and-drop operation of the left common range Ca and the right common range Cb, display of which has been updated, is performed again, the control section 20 receives another moving operation (moving operation after the tentative determination operation) for the left reference point Sa and the right reference point Sb.

Further, through the function of the angle setting section 21*c*, the control section 20 moves the positions of the left reference point Sa and the right reference point Sb in the left peripheral image Na and the right peripheral image Nb, respectively, to a predetermined reference position, and increases the unit movement amount in the case where an operation of moving the left reference point Sa and the right reference point Sb out of the left peripheral image Na and the right peripheral image Nb, respectively, is received after a tentative determination operation has been received. That is, in the case where a drag-and-drop operation of the left common range Ca is received after a tentative determination operation and the drop position is outside the left peripheral image Na, the control section 20 returns the unit movement amount to the value (1) before the tentative determination operation, and moves the left reference point Sa to a predetermined reference position. Similarly, in the case where a drag-and-drop operation of the right common range Cb is received after a tentative determination operation has been received and the drop position is outside the right peripheral image Nb, the control section 20 returns the unit movement amount to the value (1) before the tentative determination operation, and moves the right reference point Sb to a predetermined reference position. The control section 20 may consider that an operation of moving the left reference point Sa and the right reference point Sb out of the left peripheral image Na and the right peripheral image Nb, respectively, has been received in the case where the moving speed of the finger etc. in the drag-and-drop operation is equal to or more than a threshold (in the case where a flick operation is received).

In the embodiment, the term "reference position" means the initial position of each of the left reference point Sa and the right reference point Sb before a moving operation is performed. The initial position of each of the left reference point Sa and the right reference point Sb is the position that is currently actually visually recognizable at the center of the mirror surface of each of the left rearview mirror 42a and the right rearview mirror 42b. The control section 20 acquires the angles Ta and Tb of the left rearview mirror 42a and the right rearview mirror 42b, respectively, which are actually set by the rearview mirror ECU 40, and the viewpoint position P. The control section 20 acquires, in the rearview mirror viewing field information 30b, the center position Ga which is correlated with the angle Ta and the viewpoint position P, and the center position Gb which is correlated with the angle Tb and the viewpoint position P, as the reference positions of the left reference point Sa and the right reference point Sb. Through the function of the peripheral image display section 21a, the control section 20 acquires the left common range Ca and the right common range Cb on the basis of the reference position of the left reference point Sa and the right reference point Sb, respectively, before a moving operation is performed, that is, before a tentative determination operation, and displays the left common range Ca and the right common range Cb in the left peripheral image Na and the right peripheral image Nb, respectively.

Through the function of the angle setting section 21c, the control section 20 sets the angles Ta and Tb of the left rearview mirror 42a and the right rearview mirror 42b in the rearview mirror ECU 40 in accordance with the positions of the left reference point Sa and the right reference point Sb which have been moved and the viewpoint position P of the user. Specifically, in the case where a determination operation for the positions of the left reference point Sa and the right reference point Sb is performed, the control section 20 acquires the positions of the left reference point Sa and the right reference point Sb (the positions of the points which have been moved or the reference positions) and the viewpoint position P based on the state of the driver's seat 47. Then, the control section 20 acquires the angle Ta of the left rearview mirror 42a which is correlated with the left center position Ga that is the closest to the left reference point Sa, among the left center positions Ga which are correlated with the viewpoint position P, in the rearview mirror viewing field information 30b, and sets the angle Ta in the rearview mirror ECU 40. Similarly, the control section 20 acquires the angle Tb of the right rearview mirror 42b which is correlated with the right center position Gb that is the closest to the right reference point Sb, among the right center positions Gb which are correlated with the viewpoint position P, in the rearview mirror viewing field information 30b, and sets the angle Tb in the rearview mirror ECU 40. Consequently, a position in the real space corresponding to the position of each of the left reference point Sa and the right reference point Sb becomes visually recognizable around the center of the mirror surface of each of the left rearview mirror 42a and the right rearview mirror 42b.

In the embodiment, in the case where a moving operation is not received for a predetermined time-out period (e.g. 10 seconds) or more, the control section 20 considers that a determination operation for the positions of the left reference point Sa and the right reference point Sb has been performed. The control section 20 may consider that a determination operation has been performed in the case where the finger etc. touches a predetermined operation region (button) displayed on the touch panel 44.

In the embodiment described above, the user can adjust the positions of the left reference point Sa and the right reference point Sb as desired by performing a moving operation, and can set the angles Ta and Tb of the left rearview mirror 42a and the right rearview mirror 42b, respectively, such that the positions of the left reference point Sa and the right reference point Sb are visually recognizable. That is, the angles Ta and Tb of the left rearview mirror 42a and the right rearview mirror 42b, respectively, can be set such that a position that the user desires to see is visually recognizable.

In addition, by displaying images that identify the left visible region Va and the right visible region Vb in the left peripheral image Na and the right peripheral image Nb respectively, the user can confirm, in the left peripheral image Na and the right peripheral image Nb, regions that are visually recognizable by varying the angles Ta and Tb of the left rearview mirror 42a and the right rearview mirror 42b, respectively. Thus, the user can adjust the positions of the left reference point Sa and the right reference point Sb in the left visible region Va and the right visible region Vb, respectively. That is, it is possible to prevent the left reference point Sa and the right reference point Sb from being moved to a position that is not visually recognizable in the first place.

In addition, the left rearview mirror viewing field Fa and the right rearview mirror viewing field Fb are displayed in the left peripheral image Na and the right peripheral image Nb, respectively. Therefore, regions around the left reference point Sa and the right reference point Sb that are visually recognizable in the left rearview mirror 42a and the right rearview mirror 42b, respectively, can be confirmed at the same time as the positions of the left reference point Sa and the right reference point Sb in the case where the angles Ta and Tb are adjusted such that the positions of the left reference point Sa and the right reference point Sb are visually recognizable. For example, in the case where the size of the region that is visually recognizable in each of the left rearview mirror 42a and the right rearview mirror 42b is varied in accordance with the position of each of the left reference point Sa and the right reference point Sb, the size of the region that is visually recognizable together with the left reference point Sa and the right reference point Sb can be confirmed by confirming the size of each of the left rearview mirror viewing field Fa and the right rearview mirror viewing field Fb.

In the embodiment, in addition, the left rearview mirror viewing field Fa and the right rearview mirror viewing field Fb are displayed in the case where a tentative determination operation for the positions of the left reference point Sa and the right reference point Sb is received. Consequently, display in the left peripheral image Na and the right peripheral image Nb can be simplified by omitting display of the left rearview mirror viewing field Fa and the right rearview mirror viewing field Fb before a tentative determination operation is performed, which makes it easy to move the left reference point Sa and the right reference point Sb to a target position in the left peripheral image Na and the right peripheral image Nb.

In addition, the positions of the left reference point Sa and the right reference point Sb can be finely adjusted by reducing the unit movement amount after a tentative determination operation is performed. Thus, the user can move each of the left reference point Sa and the right reference point Sb to a location around the target position before a tentative determination operation is performed, and accurately move each of the left reference point Sa and the right reference point Sb to the target position after a tentative determination operation is performed.

In the case where an operation of moving the left reference point Sa and the right reference point Sb out of the left peripheral image Na and the right peripheral image Nb is received after a tentative determination operation has been received, the left reference point Sa and the right reference point Sb can be moved significantly by canceling the state in which the positions of the left reference point Sa and the right reference point Sb can be finely adjusted after a tentative determination operation by increasing the unit movement amount. In the case where an operation of moving the left reference point Sa and the right reference point Sb out of the left peripheral image Na and the right peripheral image Nb, respectively, is received, in addition, movement of the left reference point Sa and the right reference point Sb can be started over from the reference position by moving the position of each of the left reference point Sa and the right reference point Sb to the reference position. The operation of moving the left reference point Sa and the right reference point Sb out of the left peripheral image Na and the right peripheral image Nb, respectively, is an indication of the intention of the user to stop fine adjustment and significantly move the left reference point Sa and the right reference point Sb, and the user can cancel the state in which the left reference point Sa and the right reference point Sb can be finely adjusted through an intuitive operation.

As discussed above, the angles Ta and Tb of the left rearview mirror 42a and the right rearview mirror 42b at which the positions of the left reference point Sa and the right reference point Sb are visually recognizable, respectively, also depend on the viewpoint position P of the user. Thus, the angles Ta and Tb of the left rearview mirror 42a and the right rearview mirror 42b can be accurately set by setting the angles Ta and Tb of the left rearview mirror 42a and the right rearview mirror 42b, respectively, in accordance with the positions of the left reference point Sa and the right reference point Sb which have been moved and the viewpoint position P of the user.

In addition, a position that is appropriate as the viewpoint position P at the time of driving can be acquired by acquiring the viewpoint position P on the basis of the state of the driver's seat 47 on which the user is seated. It is highly likely that the user is visually recognizing the touch panel 44 in order to move the left reference point Sa and the right reference point Sb. Therefore, a position that is appropriate as the viewpoint position P at the time of driving when the user is looking forward cannot be detected even by detecting the position of the eyes or the direction of the face of the user using a sensor, for example.

Further, it is possible to recognize a visually recognizable range, even if the viewpoint position P deviates within the error range E, by displaying the common ranges Ca and Cb in the left peripheral image Na and the right peripheral image Nb, respectively, the common ranges Ca and Cb being commonly visually recognizable in the case where the left rearview mirror 42a and the right rearview mirror 42b at the angles Ta and Tb adjusted respectively such that the positions of the left reference point Sa and the right reference point Sb are visually recognizable are seen from any position within the error range E from the viewpoint position P.

(2) Rearview Mirror Angle Setting Process

Next, a rearview mirror angle setting process executed by the control section 20 will be described in detail. FIG. 4 is a flowchart of the rearview mirror angle setting process. First, the control section 20 receives a touch operation by the finger etc. on a rearview mirror angle setting button displayed on the touch panel 44 (step S100). In the embodiment, a rearview mirror angle setting button is provided for each of the left rearview mirror 42a and the right rearview mirror 42b to allow selection of the left rearview mirror 42a or the right rearview mirror 42b, for which it is desirable to set the angle Ta or Tb. In the following description of the rearview mirror angle setting process, it is assumed that the rearview mirror angle setting button for setting the angle Ta of the left rearview mirror 42a has been operated.

Next, through the function of the peripheral image display section 21a, the control section 20 causes the touch panel 44 to display the left peripheral image Na (step S105). That is, the control section 20 displays the left peripheral image Na which includes the left visible region Va which is visually recognizable in the left rearview mirror 42a at the variable angle Ta (FIG. 2B).

Next, the control section 20 acquires the viewpoint position P of the user (step S110). Specifically, the control section 20 acquires a signal that indicates the current adjustment state of the entire driver's seat 47 (such as the front-rear position of the seat, the height of the seat surface portion, and the inclination angle of the backrest portion) from the seat ECU 45, and acquires the viewpoint position P of the user seated on the driver's seat 47 on the basis of the signal.

Next, through the function of the peripheral image display section 21a, the control section 20 displays an image that identifies the left visible region Va in the left peripheral image Na (step S115). First, the control section 20 acquires, as the left visible region Va, a range that is visually recognizable from the viewpoint position P in the case where the left rearview mirror 42a is varied to any angle Ta. Specifically, the control section 20 acquires all the left rearview mirror viewing fields Fa correlated with the viewpoint position P in the rearview mirror viewing field information 30b. Then, the control section 20 superposes all the left rearview mirror viewing fields Fa correlated with the viewpoint position P on the left peripheral image Na, and acquires a region covered by at least one left rearview mirror viewing field Fa as the left visible region Va. Then, as indicated by the broken line in FIG. 2B, the control section 20 displays, in the left peripheral image Na, a boundary line that identifies the left visible region Va from the other region.

Through the function of the angle setting section 21c, the control section 20 resets the position of the left reference point Sa to the reference position (initial position) (step S120). The reference position is a position that is actually visually recognizable at the center of the mirror surface of the left rearview mirror 42a in the case where the left rearview mirror 42a is currently seen from the viewpoint position P. The control section 20 acquires the angle Ta of the left rearview mirror 42a which is actually set by the rearview mirror ECU 40 and the viewpoint position P, and acquires the left center position Ga which is correlated with the angle Ta and the viewpoint position P in the rearview mirror viewing field information 30b as the reference position of the left reference point Sa.

Next, through the function of the angle setting section 21c, the control section 20 resets the unit movement amount to the value obtained before the tentative determination operation (>value obtained after the tentative determination operation) (step S122). Here, the term "unit movement amount" means a distance over which the left reference point Sa is moved per unit amount (unit operation amount) of the operation amount which is the distance over which the user drags the finger etc. on the touch panel 44. In the case where the value (0.3) obtained after the tentative determination operation is set as the unit movement amount, resetting the unit movement amount to the value (1) obtained before the tentative determination operation in step S122 means increasing the unit movement amount.

Next, through the function of the reference point display section 21b, the control section 20 displays the left common range Ca in the left peripheral image Na. Specifically, the control section 20 acquires the angle Ta of the left rearview mirror 42a at which the current position of the left reference point Sa is visually recognized at the center, and acquires all the viewpoint positions P within the error range E centered on the viewpoint position P. Then, the control section 20 acquires, in the rearview mirror viewing field information 30b, all the left rearview mirror viewing fields Fa correlated with combinations of the angle Ta of the left rearview mirror 42a at which the current position of the left reference point Sa is visually recognizable at the center and all the viewpoint positions P within the error range E, and acquires a region within the left peripheral image Na overlapped by all the acquired left rearview mirror viewing fields Fa as the left common range Ca. Then, as indicated as hatched in FIG. 2B, the control section 20 displays the left common range Ca in the left peripheral image Na.

Next, through the function of the angle setting section 21c, the control section 20 monitors an operation on the touch panel 44 (step S130). Specifically, the control section 20 monitors a moving operation for the left reference point Sa, that is, a drag-and-drop operation of the left common range Ca, on the touch panel 44.

Through the function of the angle setting section 21c, the control section 20 determines whether or not a moving operation for the left reference point Sa has been received (step S130). In the embodiment, in the case where a drag-and-drop operation of the left common range Ca is not received for a predetermined time-out period or more, the control section 20 does not determine that a moving operation for the left reference point Sa has been received. In the case where it is not determined that a moving operation for the left reference point Sa has been received (step S135: N), the control section 20 considers that a determination operation for the left reference point Sa has been performed. The start time of the time-out period is either the time when display of the left peripheral image Na is started in step S105 or the end time of the moving operation for the left reference point Sa received last, whichever is the latter. That is, in the case where a moving operation for the left reference point Sa is not performed for the time-out period or more since the left peripheral image Na was displayed, or in the case where the next moving operation is not performed for the time-out period or more since a moving operation for the left reference point Sa was performed last, the control section 20 receives a determination operation for determining the position of the left reference point Sa at the current position.

In the case where it is not determined that a moving operation for the left reference point Sa has been performed (step S135: N), that is, a determination operation for the left reference point Sa has been performed, the control section 20 sets the angle Ta of the left rearview mirror 42a corresponding to the position of the left reference point Sa in the rearview mirror ECU 40 (step S165). Specifically, the control section 20 acquires the position of the left reference point Sa (the position of the point which has been moved or the reference position) at the time when the determination operation was performed and the viewpoint position P based on the state of the driver's seat 47. Then, the control section 20 acquires the angle Ta of the left rearview mirror 42a which is correlated with the left center position Ga that is the closest to the left reference point Sa, among the left center positions Ga which are correlated with the viewpoint position P, in the rearview mirror viewing field information 30b, and sets the angle Ta in the rearview mirror ECU 40. Consequently, a position in the real space corresponding to the position of the left reference point Sa at the time when the determination operation was performed becomes visually recognizable around the center of the mirror surface of the left rearview mirror 42a.

In the case where it is determined that a moving operation for the left reference point Sa has been received (step S135: Y), on the other hand, through the function of the angle setting section 21c, the control section 20 determines whether or not the moving operation is an operation of moving the left reference point Sa into the left peripheral image Na (step S140). The case in which it is determined that a moving operation for the left reference point Sa has been received refers to a case where a moving operation for the left reference point Sa is received within the time-out period. In step S135, the control section 20 acquires the drop position in the moving operation for the left reference point Sa, and determines that the moving operation is an operation of moving the left reference point Sa into the left peripheral image Na in the case where the drop position is in the left peripheral image Na.

In the case where it is not determined that the moving operation for the left reference point Sa is an operation of moving the left reference point Sa into the left peripheral image Na (step S140: N), the control section 20 returns to step S120. That is, in the case where a moving operation of moving the left reference point Sa out of the left peripheral image Na is received, the control section 20 resets the position of the left reference point Sa to the initial reference position (step S120), and resets the unit movement amount to the value (1) before the tentative determination operation (step S122). That is, movement of the left reference point Sa due to the moving operation which has been made so far is canceled, and the unit movement amount is returned to the value before the tentative determination operation.

In the case where it is determined that the moving operation for the left reference point Sa is an operation of moving the left reference point Sa into the left peripheral image Na (step S140: Y), through the function of the angle setting section 21c, the control section 20 acquires the position of the reference point which has been moved (step S145). Specifically, the control section 20 acquires an operation direction which is the direction from the drag position to the drop position in the moving operation and an operation amount which is the linear distance from the drag position to the drop position. Then, the control section 20 acquires, as the position of the left reference point Sa which has been moved, a position obtained by moving the position of the left reference point Sa which has not been moved in the operation direction, over a distance obtained by multiplying the operation amount by the unit movement amount (the value before the tentative determination operation or the value after the tentative determination operation). When a moving operation of moving the left reference point Sa into the left peripheral image Na is received (step S140: Y), it is meant that a tentative determination operation for the left reference point Sa is received.

Next, through the function of the reference point display section 21b, the control section 20 updates display of the left common range Ca (left reference point Sa) (step S150). That is, the control section 20 acquires the left common range Ca on the basis of the position of the left reference point Sa which has been moved and displays an image that indicates the left common range Ca in the left peripheral image Na using a technique that is similar to that used in step S125.

Further, through the function of the reference point display section 21b, the control section 20 displays the left rearview mirror viewing field Fa in the left peripheral image Na (step S155). That is, in the case where a tentative determination operation for the left reference point Sa is received (step S140: Y), the control section 20 displays the left rearview mirror viewing field Fa in the left peripheral image Na (solid line of FIG. 2B). The term "left rearview mirror viewing field Fa" means a range that is visually recognizable together with the position of the left reference point Sa in the case where the left rearview mirror 42a at the angle Ta adjusted such that the left reference point Sa is visually recognizable is seen. Specifically, the control section 20 acquires the angle Ta of the left rearview mirror 42a which is correlated with the left center position Ga that is the closest to the left reference point Sa, among the left center positions Ga which are correlated with the viewpoint position P based on the shape of the driver's seat 47, in the rearview mirror viewing field information 30b, and displays the left rearview mirror viewing field Fa which is correlated with the viewpoint position P and the angle Ta in the left peripheral image Na. In the case where the left rearview mirror 42a has already been displayed, that is, two or more successive moving operations for the left reference point Sa within the left peripheral image Na are received, the left rearview mirror viewing field Fa is updated in the left peripheral image Na.

Next, through the function of the angle setting section 21c, the control section 20 sets the unit movement amount to the value after the tentative determination operation (<value before the tentative determination operation) (step S160). Here, in the case where the value (1) before the tentative determination operation is set as the unit movement amount, setting the unit movement amount to the value (0.3) after the tentative determination operation by the control section 20 in step S160 means reducing the unit movement amount. When the unit movement amount is set to the value after the tentative determination operation, the control section 20 returns to step S130. That is, a moving operation for the left reference point Sa on the touch panel 44 is monitored again.

As has been described above, in the case where a tentative determination operation is received (step S140: Y), the unit movement amount is set to the value after the tentative determination operation (step S160). Thus, in the case where the process returns to step S130 and a moving operation for the left reference point Sa is received again, the value after the tentative determination operation (<value before the tentative determination operation) is applied as the unit movement amount. Therefore, the moving distance of the left reference point Sa, which is moved in correspondence with the drag distance in the moving operation for the left reference point Sa, can be reduced. Thus, the position of the left reference point Sa can be finely adjusted after the tentative determination operation. It should be noted, however, that in the case where a moving operation of moving the left reference point Sa out of the left peripheral image Na is received (step S140: N) even after the tentative determination operation, the unit movement amount is reset to the value before the tentative determination operation (step S122). Thus, the left reference point Sa can be moved significantly with the state in which the position of the left reference point Sa is finely adjustable canceled. In addition, the position of the left reference point Sa is reset to the reference position at the same time as the state in which the position of the left reference point Sa is finely adjustable is canceled (step S120). Therefore, movement of the left reference point Sa can be started over from the initial position.

The rearview mirror angle setting process for a case where the rearview mirror angle setting button for setting the angle Ta of the left rearview mirror 42a is operated has been described above. However, the rearview mirror angle setting process for a case where the rearview mirror angle setting button for setting the angle Tb of the right rearview mirror 42b is operated is also similar.

That is, the rearview mirror angle setting process for a case where the rearview mirror angle setting button for setting the angle Tb of the right rearview mirror 42b is operated can also be described by replacing the left rearview mirror 42a with the right rearview mirror 42b, replacing the left rearview mirror 42a with the right rearview mirror 42b, replacing the angle Ta of the left rearview mirror 42a with the angle Tb of the right rearview mirror 42b, replacing the left peripheral image Na with the right peripheral image Nb, replacing the left common range Ca with the right common range Cb, and replacing the left rearview mirror viewing field Fa with the right rearview mirror viewing field Fb in the description of the processes in steps S105 to S165.

(3) Other Embodiments

Through the function of the reference point display section 21b, the control section 20 may display the reference point in a smaller size as the position of the reference point in the peripheral image is farther from the vehicle. For example, the control section 20 may set a reduction ratio (0 or more and 1 or less) that becomes lower as the position of the left reference point Sa is farther from the right end of the visible region Va, and display the left common range Ca which has been converted in size using the reduction ratio in the left peripheral image Na. This gives an impression that the region that is visually recognizable in the left rearview mirror 42a and the right rearview mirror 42b becomes smaller as the angles Ta and Tb of the left rearview mirror 42a and the right rearview mirror 42b, respectively, are set such that a position that is farther from the vehicle Z can be seen, which prevents the left reference point Sa and the right reference point Sb from being set at a position that is too far from the vehicle Z.

In the embodiment, it is possible to set the angles Ta and Tb of the left rearview mirror 42a and the right rearview mirror 42b, respectively. However, it may be possible to set only one of the angles Ta and Tb of the left rearview mirror 42a and the right rearview mirror 42b, respectively. In addition, the control section 20 may display at least the reference point in the peripheral image, and may not necessarily display the common ranges Ca and Cb, the visible regions Va and Vb, and the rearview mirror viewing fields Fa and Fb identifiably in the peripheral image. In addition, the control section 20 may display a single image that includes both the visible regions Va and Vb as the peripheral image. For example, the control section 20 may acquire a single peripheral image that includes both the visible regions Va and Vb by taking or drawing an image obtained by seeing a rearward view in a wide-angle viewing field from the position at the center of the vehicle Z in the left-right direction. In addition, the control section 20 may display the rearview mirror viewing fields Fa and Fb also before a tentative determination operation is received.

Further, the control section 20 may set the angle of the rearview mirror in accordance with at least one moving operation, and may not necessarily receive a tentative determination operation or a determination operation. In addition, the control section 20 may ignore an operation of moving the reference points Sa and Sb out of the peripheral image as an invalid operation. Further, the operations on the touch panel 44 mentioned in relation to the embodiment are merely examples. For example, the rearview mirror angle setting process may be executed in accordance with a double-tap operation or a pinch operation on the touch panel 44. As a matter of course, the moving operation for the reference points Sa and Sb may be performed by moving a mouse cursor or the like. In addition, the control section 20 may not reduce the unit movement amount in the case where a tentative determination operation is received. That is, fine adjustment may not be performed after a tentative determination operation.

Further, the control section 20 may return the reference points Sa and Sb to the reference position and not increase the unit movement amount in the case where an operation of moving the reference points Sa and Sb out of the peripheral image is received. Conversely, the control section 20 may increase the unit movement amount and not return the reference points Sa and Sb to the reference position in the case where an operation of moving the reference points Sa and Sb out of the peripheral image is received. Further, the control section 20 may cause the touch panel 44 to display a reset button, for example, and return the reference points Sa and Sb to the reference position and increase the unit movement amount in the case where the finger etc. touches the reset button.

In addition, the control section 20 may set the angles Ta and Tb of the left rearview mirror 42a and the right rearview mirror 42b, respectively, on the basis of at least the position of the reference points Sa and Sb, and may not necessarily set the angles Ta and Tb of the left rearview mirror 42a and the right rearview mirror 42b, respectively, on the basis of the viewpoint position P of the user. The rearview mirror viewing field information 30b which prescribes the relationship between the angles Ta and Tb of the left rearview mirror 42a and the right rearview mirror 42b and the rearview mirror viewing fields Fa and Fb, respectively, may be prepared only for the viewpoint position P of the user in the average state of all the states of the driver's seat 47. Similarly, the control section 20 may not necessarily cause the common ranges Ca and Cb, the visible regions Va and Vb, and the rearview mirror viewing fields Fa and Fb to depend on the viewpoint position P of the user. For example, the control section 20 may acquire the common ranges Ca and Cb, the visible regions Va and Vb, and the rearview mirror viewing fields Fa and Fb on the basis of the viewpoint position P of the user in the average state of all the states of the driver's seat 47. Consequently, the processing load for acquiring the common ranges Ca and Cb, the visible regions Va and Vb, and the rearview mirror viewing fields Fa and Fb can be reduced.

In addition, the viewpoint position P of the user may not necessarily be acquired on the basis of the state of the seat on which the user is seated. For example, the control section 20 may acquire the viewpoint position P of the user on the basis of an operation by the user for designating the viewpoint position P of the user, or may acquire the viewpoint position P of the user on the basis of a signal from a sensor that detects the viewpoint position P of the user at the time of driving.

The embodiment described above is an example, and a variety of other embodiments can be adopted. The term "rearview mirror" may refer to any mirror provided to the vehicle and having a mirror surface at a variable angle, and may refer to an inner rearview mirror called "back mirror", or may refer to an outer rearview mirror called "fender mirror", "door mirror", or "side mirror". The visible region is a region that is visually recognizable in the peripheral image in the case where the angle of the rearview mirror is varied within the movable range. The visible region may be specified by examining the region that is visually recognizable while the angle of the rearview mirror is actually varied within the movable range, or may be specified by estimating the position of a light source of light reflected by the rearview mirror to reach the viewpoint position of the user in the case where the angle of the rearview mirror is varied within the movable range.

The peripheral image display means may display the peripheral image of the vehicle which includes the visible region on the display section, and may display an image taken by a camera that includes the visible region in the viewing field as the peripheral image, or may display an image drawn such that the visible region is included in the viewing field as the peripheral image. The peripheral image may be a peripheral image of the vehicle at present, or may be a peripheral image of the vehicle in the future. For example, in the case where a search has been made for an expected travel path for the vehicle, the peripheral image may be a peripheral image of the vehicle which travels on the expected travel path. Further, the peripheral image may include an image of an obstruction to the vehicle that needs to be checked in the rearview mirror. The reference point display means may display the reference point in the peripheral image, and may display an image that enables recognition of the position of the reference point in the peripheral image.

The angle setting means may move the position of the reference point in the peripheral image in accordance with the moving operation by the user, and a variety of operation aspects of the moving operation are conceivable. For example, the angle setting means may receive a drag-and-drop operation or a flick operation of the reference point which is displayed on the touch panel as the moving operation. In addition, an operation portion for moving the reference point in each direction may be prepared, and the moving operation in the direction corresponding to the operation portion may be received in the case where the operation portion is operated. In addition, the angle setting means may prepare a table that prescribes the angle of the rearview mirror at which the reference point is visually recognizable for each position of the reference point, and may set the angle of the rearview mirror with reference to the table. In addition, the angle setting means may calculate the angle of the rearview mirror at which a light ray directed from the position of the reference point toward the rearview mirror is reflected by the rearview mirror such that the light ray reaches the viewpoint position of the user, and may set the angle of the rearview mirror to the calculated angle.

In addition, the peripheral image display means may display an image that identifies the visible region and a region outside the visible region in the peripheral image. Consequently, the user can confirm the visible region which is visually recognizable in the rearview mirror in the peripheral image, and therefore can adjust the position of the reference point in the visible region. That is, it is possible to prevent the reference point from being moved to a position that is not visually recognizable in the first place. The term "image that identifies the visible region and a region outside the visible region" may refer to an image that indicates the boundary line between the visible region and the region outside the visible region, or may refer to a semi-transparent image that colors the visible region and the region outside the visible region in different colors.

Further, the reference point display means may display the rearview mirror viewing field in the peripheral image, the rearview mirror viewing field indicating a range that is visually recognizable together with the position of the reference point in the case where the rearview mirror at the angle adjusted such that the position of the reference point is visually recognizable is seen. Consequently, it is possible to confirm, in the rearview mirror viewing field, the position of the reference point and a region around the reference point that is visually recognizable in the rearview mirror at the same time in the case where the angle of the rearview mirror is adjusted such that the position of the reference point is visually recognizable. For example, in the case where the size of a region that is visually recognizable in the rearview mirror is varied in accordance with the position of the reference point, the size of a region that is visually recognizable together with the reference point can be confirmed by confirming the size of the rearview mirror viewing field. The rearview mirror viewing field may be any image that makes a range that is visually recognizable in the rearview mirror visually recognizable, and may be a line that indicates the outer edge of a range that is visually recognizable in the rearview mirror, or may be a semi-transparent image that colors the entire range that is visually recognizable in the rearview mirror.

In addition, the reference point display means may display the rearview mirror viewing field in the peripheral image in the case where a tentative determination operation for the position of the reference point is received. Consequently, display in the peripheral image can be simplified by omitting display of the rearview mirror viewing field before a tentative determination operation is performed, which makes it easy to move the reference point to a target position in the peripheral image. The term "tentative determination operation" refers to an operation performed in the case where the reference point is moved to a position that generally satisfies the user. The reference point display means may be provided with an operation portion for receiving a tentative determination operation, and receive a tentative determination operation in the case where an operation by the user on the operation portion has been detected. In addition, the reference point display means may receive a tentative determination operation when a moving operation for the reference point is ended.

Further, the angle setting means may move the position of the reference point in the peripheral image in accordance with the moving operation, either before or after a tentative determination operation is received, and reduce the unit movement amount, over which the reference point is moved in the peripheral image, in accordance with the unit operation amount of the moving operation in the case where a tentative determination operation is received. In this way, the position of the reference point can be finely adjusted by reducing the unit movement amount after a tentative determination operation is performed. Thus, the user can move the reference point to a location around the target position before a tentative determination operation is performed, and accurately move the reference point to the target position after a tentative determination operation is performed. In the case where the moving operation is a drag-and-drop operation, the drag distance may be acquired as the operation amount of the moving operation. In the case where the moving operation is a flick operation, meanwhile, the speed of the flick may be acquired as the operation amount of the moving operation.

Further, the angle setting means may move the position of the reference point in the peripheral image to a predetermined reference position and increase the unit movement amount in the case where an operation of moving the reference point out of the peripheral image is received after a tentative determination operation has been received. The reference point can be moved significantly by canceling the state in which the position of the reference point can be finely adjusted after a tentative determination operation by increasing the unit movement amount, by which the reference point is moved in the peripheral image in accordance with the unit operation amount of the moving operation. In addition, movement of the reference point can be started over from the reference position by moving the position of the reference point to the reference position. The operation of moving the reference point out of the peripheral image is an indication of the intention of the user to stop fine adjustment and significantly move the reference point, and the user can cancel the state in which the reference point can be finely adjusted through an intuitive operation.

In addition, the reference point display means may display the reference point in a smaller size as the position of the reference point in the peripheral image is farther from the vehicle. This gives an impression that the region that is visually recognizable in the rearview mirror becomes smaller as the angle of the rearview mirror is set such that a position that is farther from the vehicle (rearview mirror) can be seen, which prevents the reference point from being set at a position that is too far from the vehicle (rearview mirror).

Further, the angle setting means may set the angle of the rearview mirror in accordance with the position of the reference point which has been moved and the viewpoint position of the user. Here, the angle of the rearview mirror at which the position of the reference point is visually recognizable also depends on the viewpoint position of the user. Thus, the angle of the rearview mirror can be accurately set by setting the angle of the rearview mirror in accordance with the position of the reference point which has been moved and the viewpoint position of the user.

In addition, the viewpoint position may be acquired on the basis of the state of the seat on which the user is seated. In this way, a position that is appropriate as the viewpoint position at the time of driving can be acquired by acquiring the viewpoint position on the basis of the state of the seat on which the user is seated. It is highly likely that the user is visually recognizing the display section in order to move the reference point. Therefore, a position that is appropriate as the viewpoint position at the time of driving cannot be detected even by detecting the position of the eyes or the direction of the face of the user using a sensor, for example.

Further, the reference point display means may display the common range in the peripheral image, the common range being commonly visually recognizable in the case where the rearview mirror at the angle adjusted such that the position of the reference point is visually recognizable is seen from any position within the error range from the viewpoint position. Consequently, it is possible to recognize a visually recognizable range even if the viewpoint position deviates within the error range.

Further, the technique for setting the angle of the rearview mirror such that the reference point which has been moved in the peripheral image is visually recognizable can also be implemented as a program or a method. The rearview mirror angle setting system, program, and method described above includes various aspects such as those implemented using a single rearview mirror angle setting system and those implemented utilizing parts that are common to various portions provided in the vehicle. For example, a navigation system, method, and program that include the rearview mirror angle setting system described above can be provided. Various changes may also be made. For example, some units may be implemented using software, and the others may be implemented using hardware. Further, the functions may be implemented as a storage medium for a program that controls the rearview mirror angle setting system. As a matter of course, the storage medium for the software may totally equally be a magnetic storage medium, a magneto-optical storage medium, or any storage medium that may be developed in the future.

The invention claimed is:

1. A rearview mirror angle setting system comprising:
a processor programmed to:
   display, on a display, a peripheral image of a vehicle that includes a visible region that is visually recognizable in a rearview mirror at a variable angle;
   display a reference point in the peripheral image;
   move a position of the reference point in the peripheral image in accordance with a moving operation by a user;
   set the angle of the rearview mirror such that the position of the reference point which has been moved is visually recognizable in the rearview mirror; and
   in the case where a tentative determination operation for the position of the reference point is received:
      display a rearview mirror viewing field in the peripheral image, the rearview mirror viewing field indicating a range that is visually recognizable together with the position of the reference point in the case where the rearview mirror at the set angle is seen; and
      move the position of the reference point in the peripheral image to a predetermined reference position and increase the unit movement amount in the case where an operation of moving the reference point out of the peripheral image is received after the tentative determination operation has been received.

2. The rearview mirror angle setting system according to claim 1, wherein the processor is programmed to:
   display an image that identifies the visible region and a region outside the visible region in the peripheral image.

3. The rearview mirror angle setting system according to claim 1, wherein the processor is programmed to:
   set the angle of the rearview mirror in accordance with the position of the reference point which has been moved and a viewpoint position of the user.

4. The rearview mirror angle setting system according to claim 3, wherein
   the viewpoint position is acquired on the basis of a state of a seat on which the user is seated.

5. The rearview mirror angle setting system according to claim 3, wherein the processor is programmed to:
   display a common range in the peripheral image, the common range being visually recognizable in the case where the rearview mirror at the angle adjusted such that the position of the reference point is visually recognizable is seen from a position within an error range from the viewpoint position.

6. The rearview mirror angle setting system according to claim 1, wherein the processor is programmed to:
   move the position of the reference point in the peripheral image in accordance with the moving operation, either before or after the tentative determination operation is received, and
   reduce a unit movement amount, over which the reference point is moved in the peripheral image in accordance with a unit operation amount of the moving operation, in the case where the tentative determination operation is received.

7. The rearview mirror angle setting system according to claim 1, wherein the processor is programmed to:
   display the reference point in a smaller size as the position of the reference point in the peripheral image is farther from the vehicle.

8. A rearview mirror angle setting method comprising:
   displaying, on a display, a peripheral image of a vehicle that includes a visible region that is visually recognizable in a rearview mirror at a variable angle;
   displaying a reference point in the peripheral image;
   moving a position of the reference point in the peripheral image in accordance with a moving operation by a user;
   setting the angle of the rearview mirror such that the position of the reference point which has been moved is visually recognizable in the rearview mirror; and
   in the case where a tentative determination operation for the position of the reference point is received:
      displaying a rearview mirror viewing field in the peripheral image, the rearview mirror viewing field indicating a range that is visually recognizable together with the position of the reference point in the case where the rearview mirror at the set angle is seen; and
      moving the position of the reference point in the peripheral image to a predetermined reference position and increase the unit movement amount in the case where an operation of moving the reference point out of the peripheral image is received after the tentative determination operation has been received.

9. A non-transitory computer-readable storage medium storing a rearview mirror angle setting program that causes a computer to implement the following functions:
   displaying, on a display, a peripheral image of a vehicle that includes a visible region that is visually recognizable in a rearview mirror at a variable angle;
   displaying a reference point in the peripheral image; and
   moving a position of the reference point in the peripheral image in accordance with a moving operation by a user; and
   setting the angle of the rearview mirror such that the position of the reference point which has been moved is visually recognizable in the rearview mirror; and
   in the case where a tentative determination operation for the position of the reference point is received:
      displaying a rearview mirror viewing field in the peripheral image, the rearview mirror viewing field indicating a range that is visually recognizable together with the position of the reference point in the case where the rearview mirror at the set angle is seen; and
      moving the position of the reference point in the peripheral image to a predetermined reference position and increase the unit movement amount in the case where an operation of moving the reference point out of the peripheral image is received after the tentative determination operation has been received.

* * * * *